US010567035B1

(12) United States Patent
Torborg

(10) Patent No.: US 10,567,035 B1
(45) Date of Patent: Feb. 18, 2020

(54) METHODS, SYSTEMS, AND COMPUTER READABLE MEDIA FOR DISTRIBUTION OF TIME SYNCHRONIZATION INFORMATION TO ULTRA-WIDE-BAND DEVICES

(71) Applicant: Clairvoyant Networks, LLC, Austin, TX (US)

(72) Inventor: Tadd Christian Torborg, Raleigh, NC (US)

(73) Assignee: Clairvoyant Networks, LLC, Austin, TX (US)

( * ) Notice: Subject to any disclaimer, the term of this patent is extended or adjusted under 35 U.S.C. 154(b) by 0 days.

(21) Appl. No.: 16/294,674

(22) Filed: Mar. 6, 2019

(51) Int. Cl.
*H04W 72/04* (2009.01)
*H04B 1/7183* (2011.01)
*H04W 56/00* (2009.01)
*H04W 4/029* (2018.01)

(52) U.S. Cl.
CPC .......... *H04B 1/7183* (2013.01); *H04W 4/029* (2018.02); *H04W 56/001* (2013.01); *H04W 56/005* (2013.01); *H04W 72/0446* (2013.01)

(58) Field of Classification Search
CPC ...... H04W 72/04; H04W 88/08; H04W 76/00
See application file for complete search history.

(56) References Cited

U.S. PATENT DOCUMENTS

| | | |
|---|---|---|
| 6,829,534 B2 | 12/2004 | Fuchs et al. |
| 10,484,833 B1 | 11/2019 | Torborg |
| 10,495,737 B1 | 12/2019 | Torborg |
| 2003/0198212 A1* | 10/2003 | Hoctor ................. H04B 1/7183 370/350 |
| 2005/0130669 A1 | 6/2005 | Mizugaki et al. |
| 2005/0237966 A1 | 10/2005 | Aiello et al. |
| 2005/0237981 A1 | 10/2005 | Aiello et al. |
| 2005/0271120 A1 | 12/2005 | Hoctor |
| 2006/0291537 A1 | 12/2006 | Fullerton et al. |
| 2007/0139191 A1 | 6/2007 | Quatro |
| 2008/0075153 A1 | 3/2008 | Roberts et al. |
| 2008/0103696 A1 | 5/2008 | Cheok et al. |
| 2008/0170559 A1* | 7/2008 | Zumsteg ................. G01S 7/003 370/350 |
| 2009/0055123 A1 | 2/2009 | Razzell |
| 2009/0231136 A1 | 9/2009 | Sugla et al. |

(Continued)

OTHER PUBLICATIONS

Non-Final Office Action for U.S. Appl. No. 16/270,560 (dated Apr. 18, 2019).

(Continued)

*Primary Examiner* — Hassan A Phillips
*Assistant Examiner* — Prenell P Jones
(74) *Attorney, Agent, or Firm* — Jenkins, Wilson, Taylor & Hunt, P.A.

(57) ABSTRACT

Methods, systems, and computer readable media for distribution of time synchronization information to ultra-wide-band (UWB) devices are disclosed. A system includes anchors and tags having synchronized timing systems. The system includes a site master configured for transmitting a first time-synchronization message to at least a first anchor. The first anchor is configured for distributing time synchronization information to at least a second anchor by transmitting a first UWB message during an assigned time slot for the first anchor. The first UWB message includes timing information based on the first time-synchronization message.

10 Claims, 5 Drawing Sheets

(56) References Cited

U.S. PATENT DOCUMENTS

| | | |
|---|---|---|
| 2010/0266003 A1 | 10/2010 | Patino-Studencka et al. |
| 2010/0277286 A1* | 11/2010 | Burkart .............. G06K 19/0701 |
| | | 340/10.34 |
| 2010/0322208 A1 | 12/2010 | Tsudaka |
| 2011/0051847 A1 | 3/2011 | Flury et al. |
| 2011/0092223 A1 | 4/2011 | Nakagawa et al. |
| 2011/0140970 A1 | 6/2011 | Fukagawa et al. |
| 2011/0274141 A1 | 11/2011 | Jantunen et al. |
| 2013/0051507 A1 | 2/2013 | Jantunen et al. |
| 2013/0154836 A1 | 6/2013 | Derrico et al. |
| 2014/0210660 A1 | 7/2014 | Larose et al. |
| 2014/0253388 A1* | 9/2014 | Jalali ......................... G01S 5/06 |
| | | 342/458 |
| 2014/0304351 A1 | 10/2014 | Davis |
| 2014/0315582 A1 | 10/2014 | Dong et al. |
| 2015/0087331 A1* | 3/2015 | Yang ......................... G01S 5/02 |
| | | 455/456.1 |
| 2015/0200706 A1 | 7/2015 | Bottazzi et al. |
| 2016/0044626 A1 | 2/2016 | Li et al. |
| 2016/0357193 A1 | 12/2016 | Bruemmer et al. |
| 2017/0026807 A1* | 1/2017 | Gherardi .............. H04W 4/021 |
| 2017/0131383 A1* | 5/2017 | Bartov ....................... G01S 5/14 |
| 2017/0244444 A1 | 8/2017 | Bruemmer et al. |
| 2017/0261592 A1 | 9/2017 | Min et al. |
| 2017/0336493 A1 | 11/2017 | Gross |
| 2018/0045807 A1 | 2/2018 | Senna et al. |
| 2018/0059231 A1 | 3/2018 | Dewberry et al. |
| 2018/0067191 A1* | 3/2018 | Hamilton .................. G01S 5/14 |
| 2018/0133580 A1 | 5/2018 | DeAngelis et al. |
| 2018/0213492 A1 | 7/2018 | Xia |
| 2018/0254925 A1* | 9/2018 | Dutz ..................... G01S 13/762 |
| 2018/0272221 A1* | 9/2018 | Sundararajan ........... G09B 9/00 |
| 2019/0104493 A1* | 4/2019 | Hedley .................. H04W 4/33 |

OTHER PUBLICATIONS

Commonly-assigned, co-pending U.S. Appl. No. 16/383,301 for "Methods, Systems and Computer Readable Media for Providing and Using Ultra Wideband Local Area Networks (LANs)," (Unpublished, filed Apr. 12, 2019).

Commonly-assigned, co-pending U.S. Appl. No. 16/270,560 for "Methods, Systems, and Computer Readable Media for Time-Slotted Ultra-Wide-Band Object Tracking," (Unpublished, filed Feb. 7, 2019).

"Location Finds Bluetooth, Ultra-Wideband," Slashdot, https://mobile.slashdot.org/story/19/01/28/1630225/location-finds-bluetooth-ultra-wideband?utm_source=rss1.0mainlinkanon&utm_medium=feed, pp. 1-8 (Jan. 28, 2019).

Merritt, "Location Finds Bluetooth, UWB," EE Times, https://www.eetimes.com/document.asp?doc_id=1334243#, pp. 1-3 (Jan. 28, 2019).

"DW1000 Datasheet," Decawave IEEE802.15.4-2011 UWB Transceiver, Version 2.18, pp. 1-49 (2017).

"DW1000 User Manual," Decawave Ltd., Version 2.17, pp. 1-247 (2017).

"EVK1000 User Manual," Decawave Ltd., Version 1.13, pp. 1-30 (2016).

"TREK1000 User Manual," Decawave Ltd., Version 1.08, pp. 1-54 (2016).

"APS013 Application Note: The implementation of two-way ranging with the DW1000," Decaware, Version 2.3, pp. 1-15 (2015).

"APS016 Application Note: Moving from Trek1000 to a Product," Decaware, Version 2.3, pp. 1-24 (2015).

Gaffney, "Considerations and Challenges in Real Time Locating Systems Design," Decawave Ltd., White Papers, pp. 1-5 (Jun. 1, 2015).

McElroy et al., "Comparison of wireless clock synchronization algorithms for indoor location systems," International Conference on Communications, pp. 1-6 (Jun. 2014).

Yavari et al., "Ultra Wideband Wireless Positioning Systems," Technical Report TR14-230, pp. 1-51 (Mar. 27, 2014).

Notice of Allowance and Fee(s) Due for U.S. Appl. No. 16/383,301 (dated Aug. 2, 2019).

Notice of Allowance and Fee(s) Due for U.S. Appl. No. 16/270,560 (dated Aug. 1, 2019).

Applicant-Initiated Interview Summary for U.S. Appl. No. 16/270,560 (dated Jul. 18, 2019).

* cited by examiner

METHODS, SYSTEMS, AND COMPUTER READABLE MEDIA FOR DISTRIBUTION OF TIME SYNCHRONIZATION INFORMATION TO ULTRA-WIDE-BAND DEVICES

TECHNICAL FIELD

The subject matter described herein relates to ultra-wideband communications. More particularly, the subject matter described herein relates to methods, systems, and computer readable media for distribution of time synchronization information to ultra-wide-band devices.

BACKGROUND

Many systems make use of signal strength to guess at how far away a calibrated (transmit signal level) sender is located. Being able to accurately measure the actual distance between devices would be valuable but, until recently, no practical scheme existed which could perform that function with useful precision in small areas.

RADAR (Radio Detection and Ranging) has been used since World War II to measure distance, counting the time between radio transmission of a pulse and reception of the echo (radio time-of-flight). RADAR uses a high-powered radio signal with enough energy that the signal reflected by a passive metal object at a distance still had enough energy to be received back at the RADAR transceiver. Because of the distances involved, thousands of feet to miles, the precision of the timers used in RADAR didn't have to be very good. The speed of a radio message is about 5.4 microseconds per mile. A RADAR set with a one-megahertz counter would count about 5.4 ticks per mile. RADAR only worked in long distances and with very poor precision compared to the size of an indoor stage.

Some modern aircraft tracking systems use a scheme with an active transmitter called a transponder. The transponder notices the RADAR radio signal pulse and immediately transmits a complex radio message containing useful information about the aircraft. This supplemental information could even include the latitude and longitude of the aircraft, measured using global positioning system (GPS) equipment, giving redundant information back to the aircraft tracking network.

The challenge of tracking equipment inside a building isn't solved by RADAR or GPS. RADAR is too high energy and GPS is dependent on radio line-of-site with orbiting satellites. However, the transponder mechanism would be useful, if the time-delay between radio signal pulse and transponder response was knowable, and if the time-of-flight could be measured with much greater precision than 70-year-old RADAR technology.

In the ensuing 70 years, radio devices have become smaller and more sophisticated. We can now purchase integrated circuit (IC) radios which cost as little as $1 and which are far more sensitive than the old equipment, and which deliver digital data and receive signal strength. These radio IC chips have been used by tracking systems to provide location resolution with several meter precision. Time-of-flight measurement was still not practical until very recently.

Accordingly, in light of these difficulties associated with conventional solutions, there exists a need for methods, systems, and computer readable media for distribution of time synchronization information to ultra-wide-band devices.

SUMMARY

According to one aspect, a system for distribution of time synchronization information to ultra-wide-band (UWB) devices includes anchors and tags having synchronized timing systems. The system includes a site master configured for transmitting a first time synchronization message to at least a first anchor. The first anchor is configured for distributing time synchronization information to at least a second anchor by transmitting a first UWB message during an assigned time slot for the first anchor. The first UWB message includes timing information based on the first time-synchronization message.

In another aspect, a system for distribution of time synchronization information to ultra-wide-band (UWB) devices includes anchors and tags having synchronized timing systems. The system includes a site master configured for transmitting a first time-synchronization message to a first anchor in a first UWB coverage island and a second anchor in a second UWB coverage island. The first anchor is configured for distributing time synchronization information to anchors within the first UWB coverage island by UWB transmissions. The second anchor is configured for distributing time synchronization information to some other anchors within the second UWB coverage island by UWB transmissions.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by a processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

This specification describes methods, systems, and computer readable media for time-slotted ultra-wide-band (UWB) object tracking. The methods, systems, and computer readable media can be used, for example, to establish the location of mobile assets inside a facility (e.g., one or more buildings) and relay that information to a remote computer system such as a cloud service.

The systems described in this specification can be used, for example, to generate a range from each of several fixed stations, called "anchors," to each of many mobile stations, called "tags." The location information can be delivered to, for example, an Internet-connected gateway device. In some examples, anchors are power-rich (e.g., alternating current (AC) powered from a wall socket) but do not have wired network connections. Tags may be power-rich but can be configured to accommodate battery power.

The deployment of anchors and tags in a facility could include large numbers of anchors and tags, e.g., hundreds of anchors and hundreds of tags. In some examples, each tag's proximity to several anchors is measured frequently, for example, between every two and every 60 seconds.

In some examples, only some parts of the facility will be populated with anchors, so tag location might not be available from all locations within the facility. However, the system can be configured to report that a tag was recently detected in the facility. The rate of that reporting, and the rate of tag precision locating can be adjustable with consideration of factors such as battery life and tag density.

Figure 1:
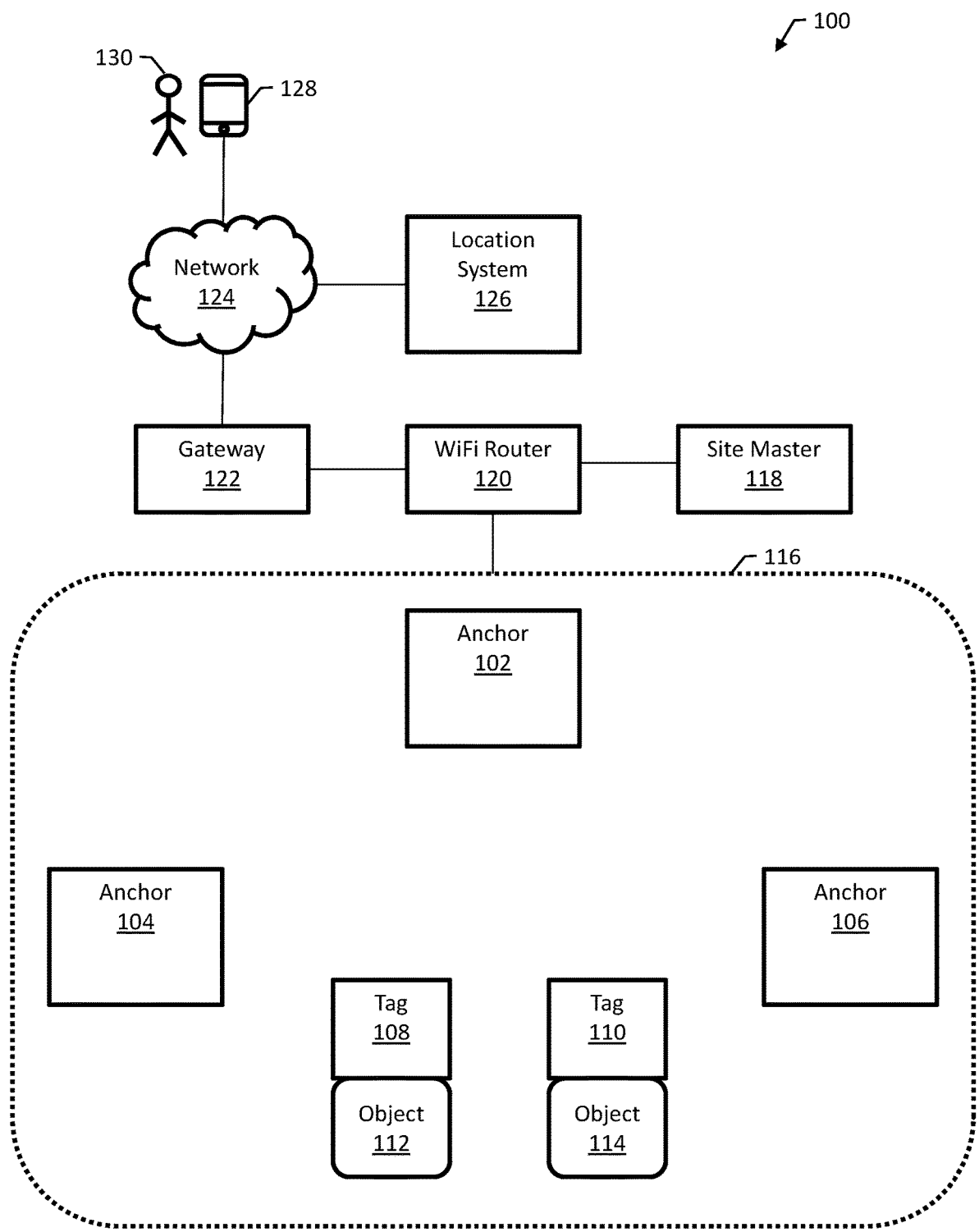
FIG. 1 is a block diagram of an example system for UWB object tracking.

FIG. 1 is a block diagram of an example system 100 for UWB object tracking. System 100 includes at least three anchors 102, 104, and 106. Each of anchors 102, 104, and 106 can include at least one processor, a UWB radio, and a timing system.

System 100 includes several tags each secured to an object for tracking. For purposes of illustration, FIG. 1 shows two tags 108 and 110 secured to two objects 112 and 114. Each of tags 108 and 110 can include at least one processor, a UWB radio, and a timing system. The tag timing systems are synchronized to the anchor timing systems. Taken together, anchors 102, 104, and 106 and tags 108 and 110 form an UWB local area network (LAN) 116.

In operation, anchors 102, 104, and 106 and tags 108 and 110 perform time-slotted UWB ranging. For example, anchors 102, 104, and 106 can perform time-slotted UWB ranging during designated time windows, one for each tag. In each time window, anchors 102, 104, and 106 sequentially transmit UWB transmissions in designated time slots of the time window, one time slot for each anchor, as specified by an order of operation. The tag assigned to the time window receives the UWB transmissions and responds to each transmission by sending a responsive UWB transmission. Anchors 102, 104, and 106 receive the responsive UWB transmissions and determine time-of-flight measurements for the responsive UWB transmissions. Then, each anchor of anchors 102, 104, and 106 determines a distance between the anchor and the tag assigned to the time window based on the time-of-flight measurements.

System 100 can include a site master 118. Site master 118 is a computer system configured for synchronizing the tag timing systems and the anchor timing systems. Site master 118 can communicate with the LAN 116, e.g., by way of a WiFi router 120.

System 100 can include a gateway 122. Gateway 122 is a computer system configured for communicating with a data communications network 124, such as the Internet, to communicate with a location system 126. Location system 126 is a computer system configured for receiving ranging information from anchors 102, 104, and 106 and determining tag locations. Location system 126 can also be configured for assigning tags to time windows, designating time slots within the time windows, and for specifying an order of operation for anchors to transmit in the time slots within the time windows.

Although system 100 is depicted as having site master 118, in some examples, another appropriate system can act as a time source for system 100. For example, gateway 122 can be configured to act as a time source, or another device on the WiFi network could be configured to act as a time source. In some examples, one of anchors 102, 104, and 106 can be configured to act as a time source, e.g., by the WiFi network or some other appropriate radio (or wired) network. For example, an anchor acting as a time source can provide a source time via UWB network 116.

System 100 can include a user device 128, e.g., a user computer or mobile phone or tablet. A user 130 can use the user device 128 to determine the location of the objects 112 and 114. For example, anchors 102, 104, and 106 can transmit ranging information for tags 108 and 110 to location system 126 by way of gateway 122, and location system 126 can receive and respond to location requests from user device 128.

In some examples, location system 126 maintains data associating tag identifiers with object identifiers and assigned time windows. For example, when user 130 secures tag 108 to object 112, a tag identifier for tag 108 can be associated with an object identifier for object 112 in a database stored at location system 126. Location system 126 can then associate the assigned time window for tag 108 with the tag identifier and the object identifier. When user 130 requests the location of object 112, user 130 can supply the object identifier in a request message. Location system 126 can look up the tag identifier and the assigned time window for the tag identifier. Location system 126 can then respond with the tag location based on the ranging message exchange during the assigned time window for the tag identifier.

In general, anchors 102, 104, and 106 report ranging distances to location system 126 (or another appropriate computer system), for example, by transmitting ranging distances to gateway 122 by way of Wi-Fi router 120, and location system 126 determines tag locations based on the reported ranging distances from the anchors.

In some examples, the tags can be used to track mobile phones. For example, some mobile phones may have embedded UWB radios that can be used as the tags shown in FIG. 1. Suppose that object 112 is a mobile phone and that tag 108 is implemented on the processor of the mobile phone and an embedded UWB radio of the mobile phone. Then, the mobile phone can, for example, register with site master 118 and the location of the mobile phone can be tracked using tag 108.

Figure 2:
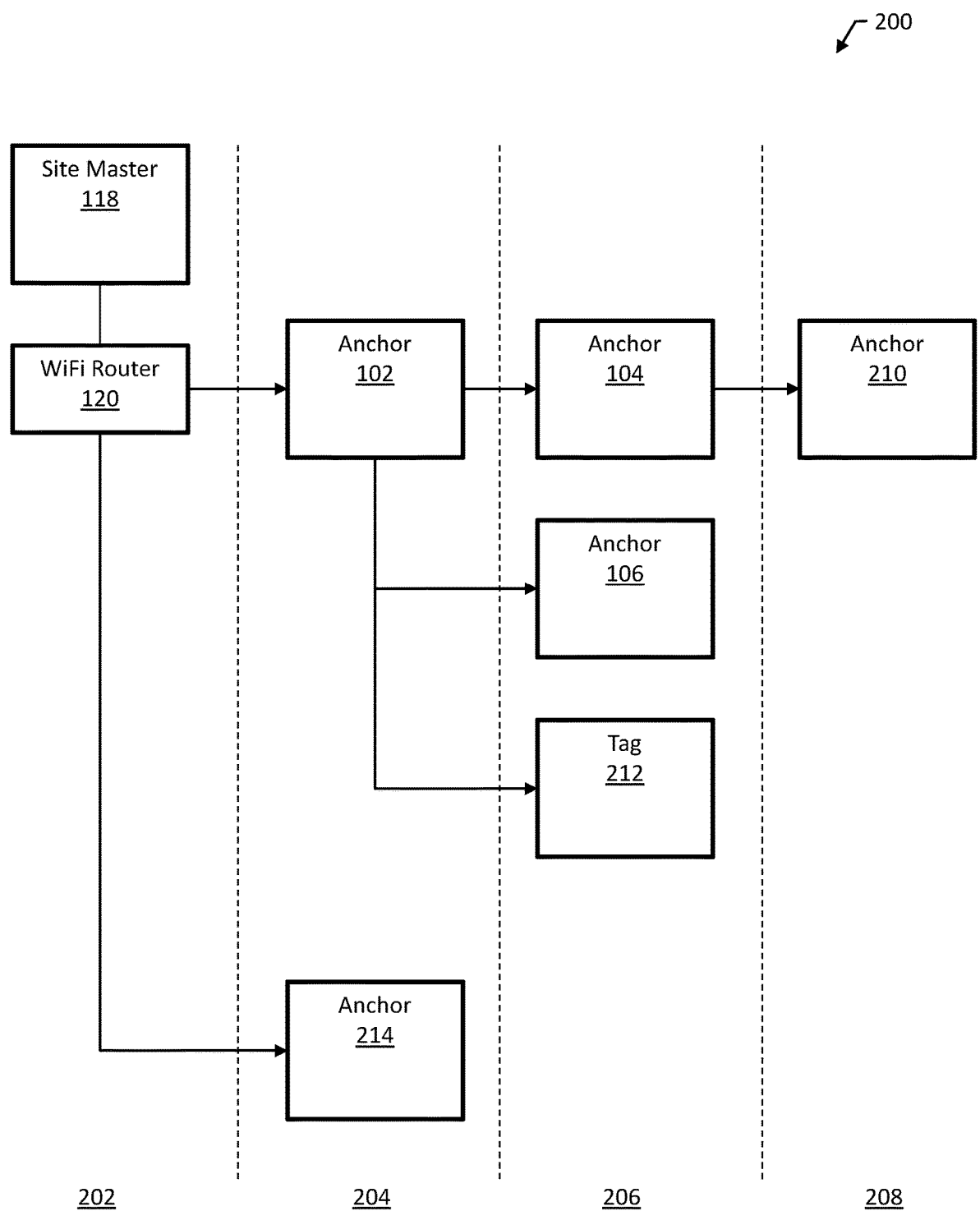
FIG. 2 is a block diagram of an example system for distribution of time synchronization information to UWB devices.

FIG. 2 is a block diagram of an example system 200 for distribution of time synchronization information to UWB devices. The fidelity of a continuous time synchronization of tags and anchors enables rapid UWB transactions from sequential different emitters without colliding, e.g., for UWB ranging transactions.

System 200 uses a hierarchical system of time sources. Each level of the hierarchy constitutes a stratum and is associated with a stratum identifier, e.g., a number starting with zero for a reference clock and incremented by one for each transmission down the hierarchy. The stratum identifier represents a distance, as a number of hops, from the reference clock.

In the example shown in FIG. 2, system 200 includes four strata 202, 204, 206, and 208. Stratum 202 includes the site master 118 of FIG. 1, which includes the reference clock for system 200. For example, site master 118 can maintain in internal clock and synchronize that internal clock to an Internet clock source. Stratum 204 includes anchor 102, and stratum 206 includes anchors 104 and 106. System 200 can include additional anchors, e.g., anchor 210 in stratum 208 and anchor 214 in stratum 204.

In general, site master 118 operates a precise clock which is set to an Internet clock source but is self-generated, i.e., such that the clock is configured to provide timing information without a requirement of being synchronized to an external device. Site master 118 can maintain and send precise time signals via the Wi-Fi network to select anchors. Precision can be arranged, in some examples, to be around a millisecond+/−of time to each device. This would permit devices to have clock synchronization within 2 mS of each other. Since UWB ranging exchanges can be much shorter in time than 2 mS, it may be useful to have time synchronization precision better than 2 mS.

UWB can be used for distribution of time synchronization information. Unlike Wi-Fi, UWB has a deterministic transmit latency, which can be controlled by the processors on both ends of a UWB link. The precision of time synchronization delivery can be, e.g., a large fraction of a microsecond, resulting in a similar accuracy for the resulting synchronization between the corresponding timing systems on both ends of the UWB link. In some cases, this can be 2000 time more accurate than using Wi-Fi with generic Wi-Fi devices for site-wide Wi-Fi connectivity.

Using UWB to distribute time synchronization information, however, may cause problems regarding overpopulation of UWB devices. If two UWB devices transmit time synchronization information, for example, such that both devices are on the air at the same time, a receiver in range of both transmitters may completely fail to receive either transmission.

System 200 is configured to avoid some of these types of collisions by assigning anchors to transmit time synchronization information in specifically assigned time slots. The assignment of time slots can be performed, for example, by a system installer when setting up the system. Transmitting time synchronization can include transmitting the current time from the timing system of an anchor and possibly other information, e.g., a stratum identifier.

By defining the distribution of time synchronization information with attention to the physical radio frequency range of the transmissions, system 200 can be configured to distribute time synchronization information across a large physical volume with precision of, e.g., 10 uS, and in a very short time interval, e.g., several milliseconds. In general, anchors are assigned time slots such that no two anchors that are within the physical radio frequency range of each other are assigned to transmit at the same time.

For example, consider the scenario illustrated in FIG. 2. Site master 118 sends time synchronization information to anchor 102 by Wi-Fi. Anchor 102 is configured to participate in distributing time synchronization information, and anchor 102 is assigned a first time slot to transmit one or more time synchronization messages by UWB. Anchors 104 and 106 are within a physical radio frequency range of anchor 102.

When anchor 102 transmits, anchors 104 and 106 receive the time synchronization information and can synchronize their timing systems based on the received information. Anchor 102 can include a stratum identifier for stratum 204 when transmitting time synchronization information.

Anchors 104 and 106 cannot, if collisions are to be avoided, be configured to transmit time synchronization information in the same time slot as anchor 102 or at the same time as each other. Instead, in this example, anchor 106 is not configured to participate in distributing time synchronization information, and anchor 104 is assigned a second time slot to transmit one or more time synchronization messages by UWB. Anchor 104 can include a stratum identifier for stratum 206 when transmitting time synchronization information.

System 200 can include additional anchors such as anchor 210. To illustrate the further distribution of time synchronization by UWB, consider the following two examples regarding anchor 210.

In a first example, suppose that anchor 210 is within the physical radio frequency range of anchor 104. When anchor 104 transmits, anchor 210 receives the time synchronization information and can synchronize its timing system based on the received information. Anchor 210 can not, however, be configured to transmit time synchronization information in the same time slot as anchor 104. Moreover, anchor 210 can not be configured to transmit time synchronization information in the same time slot as anchor 102 so that anchor 104 does not receive conflicting UWB messages. Instead, anchor 210 can be configured to transmit time synchronization information in a third time slot, or to not participate in the distribution of time synchronization information.

In a second example, suppose than anchor 210 is beyond the physical radio frequency range of anchor 104 and anchor 102. Anchor 210 may receive time synchronization information by a series of one or more hops from anchor 104. In that case, anchor 210 may be configured to transmit in the first or second time slot, i.e., at the same time as anchor 102 or anchor 104. This kind time slot sharing may be useful, e.g., if system 200 has many anchors and a limited number of time slots within a system epoch for distribution of time synchronization information.

Anchors that receive time synchronization information can correct their timing systems in various appropriate ways based on the received time synchronization information. For example, the anchors that receive a time synchronization message from site master 118 can move toward the time reported by the site master 118, but need not immediately assume the received time, which can be useful if there is variable latency in the WiFi message delivery or corruption in the distribution process. So the anchors can move toward the received time, e.g., by adjusting the time kept by their internal timing systems by a factor proportional to a difference between the internal time and the received time.

In some examples, each anchor that receives time synchronization information from site master 118 sends a time synchronization message on a schedule announcing its stratum and announce what the local time is, e.g., both absolute-time and the time relative to the start of an epoch. In some cases, the anchors can send these messages regardless if they heard a lower-stratum source, or the site master 118, as appropriate. Recipients of the Anchor time-sync message will utilize the info included in the time-sync message and make their own judgement if the new time info replaces old.

If there is a chain of distribution such that an anchor can hear multiple steps on the chain from its receive vantage point, and if it misses an earlier transmission in the epoch, it can decide for itself if what it already has is more correct than a message it hears 2 or 3 hops later in the chain. Any anchor coming on-line after the process has started will not have to wait long to get a time-sync to work with.

In some examples, if an anchor assigned to distribute time synchronization information misses it's upstream (lower stratum) time synchronization message (e.g., due to interference or blockage of the signal) the downstream anchor will still transmit time-sync on schedule, but it can de-rate the value of its time synchronization message by increasing its stratum number. It is possible that an anchor later in the assigned chain might use a different source (part of one of the chains) in response to the de-rating, since its usual upstream neighbor is indicating a possible source of error at this time.

Time synchronization information can also be distributed to tags by UWB within system 200. For example, system 200 can include tag 212. When anchor 102 transmits time synchronization information by UWB, tag 212 can receive the time synchronization information and synchronize its timing system using the time synchronization information. In some examples, tags are battery powered and it may be useful to exclude tags from participating in distributing time synchronization information to preserve battery power. In some examples, tags receive time synchronization information from nearby anchors that act as LAN masters, which in turn get time synchronization information anchors configured to distribute time synchronization information.

One of the difficulties with synchronizing UWB stations in a facility is that some large facilities may only have UWB equipment installed in small portions of the facility. In some examples, there could be spotty UWB coverage in some places. If the UWB coverage leaves gaps, it can be useful if the equipment in all areas of the facility share a common time-sync so that, when a tag moves from one area to another, the tag can receive the precise UWB-delivered time rapidly upon arriving in the new area.

System 200 can use Wi-Fi to deliver time to a selected anchor in each UWB coverage island. The selected anchor can then distribute the time to the rest of the coverage island using UWB. Tags and other portable UWB devices can be configured for time-synching to the new coverage island's UWB time-sync transmitters even if the device is 2 milliseconds skewed from the new coverage island's UWB-precise time.

For example, suppose that anchor 102 is the selected anchor for a first UWB coverage island and anchor 214 is the selected anchor for a second UWB coverage island. If tag 212 moves out of the physical radio frequency range of anchor 102 and then into the physical radio frequency range of anchor 214, tag 212 can promptly receive time synchronization information from anchor 214 by listening for UWB transmissions during the time slots designated for distribution of time synchronization information.

Figure 3:
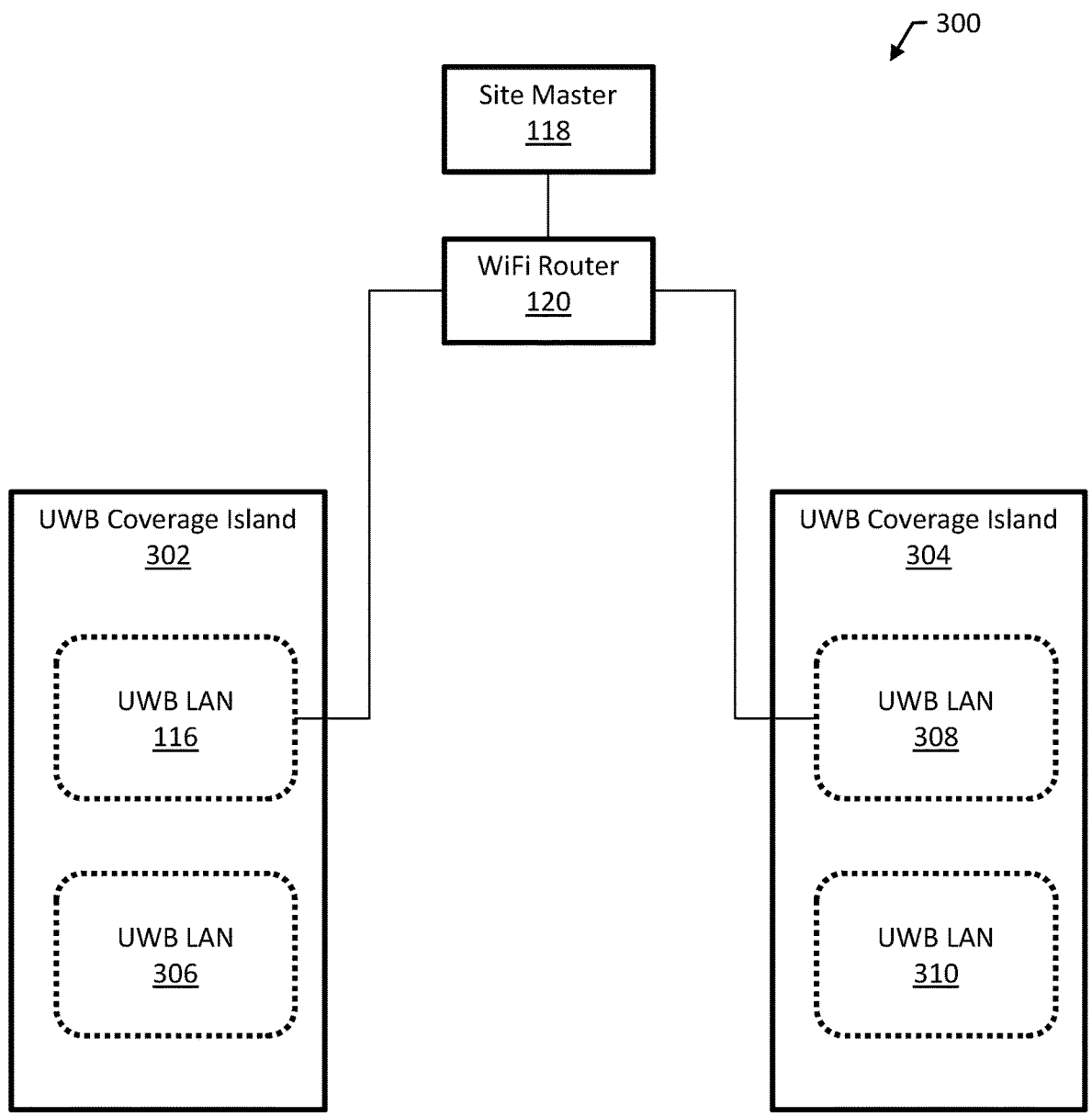
FIG. 3 is a block diagram of an example system for distribution of time synchronization information to UWB coverage islands.

FIG. 3 is a block diagram of an example system 300 for distribution of time synchronization information to UWB coverage islands. System 300 includes a first UWB coverage island 302 and a second UWB coverage island 304. A UWB coverage island is a group of UWB devices that receive time synchronization information by Wi-Fi (or other appropriate non-UWB communication) and then distribute time synchronization information within the UWB coverage island by UWB transmission.

There can be one or more UWB LANs within a UWB coverage island. A UWB LAN is an organization of nearby anchors, e.g., a number of anchors that are each within range of at least one anchor in the UWB LAN. The anchors can be within a physical radio range of an assigned LAN manager anchor associated with the UWB LAN. For example, UWB coverage island 302 includes UWB LAN 116 and UWB LAN 306, and UWB coverage island 304 include UWB LAN 308 and UWB LAN 310. Even though some anchors within UWB LAN 306 may not be within a physical radio frequency range of some other anchors within UWB LAN 116, time synchronization information can still be distributed throughout UWB coverage island 302 by time-slotted UWB transmissions as described above with reference to FIG. 2.

If a tag moves out of UWB coverage island 302 and into UWB coverage island 304, then tag can begin listening for UWB transmissions during the assigned time slots for anchors to transmit UWB time synchronization information. Since both UWB coverage island 302 and UWB coverage island 304 both receive time synchronization information from site master 118 by Wi-Fi, the tag's timing system will be sufficiently synchronized to the time distribution within UWB coverage island 304 to listen during the assigned time slots for time synchronization distribution.

If Wi-Fi coverage is provided throughout a facility, then the facility can be divided into UWB coverage islands which can each receive the time synchronization information from site master 118. Time synchronization information can then be distributed throughout the facility by Wi-Fi and then very accurately within each UWB coverage island by UWB.

Figure 4A:
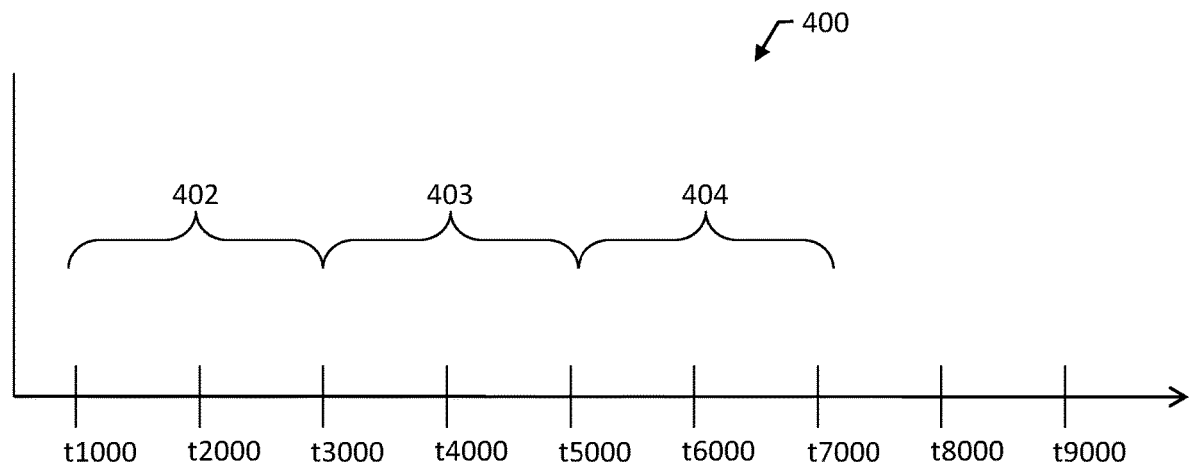
FIG. 4A is a timeline illustrating example repeating epochs.

FIG. 4A is a timeline 400 illustrating example repeating epochs of the system 100 of FIG. 1. FIG. 4A shows three epochs 402, 403, and 404. Each epoch is a time interval in which all system behaviors take place once. In each epoch, anchors 102, 104, and 106 complete time synchronization, such that each anchor that participates in time synchronization transmits during its assigned time slot. Other message exchanges, e.g., for ranging, can also occur during each epoch.

An epoch has a suitable duration for all of the system behaviors to take place once, e.g., two seconds. For example, an epoch can include six time windows, and up to six tags can be assigned to the six time windows. A time window can include enough time for, e.g., 300 ranging exchanges.

Figure 4B:
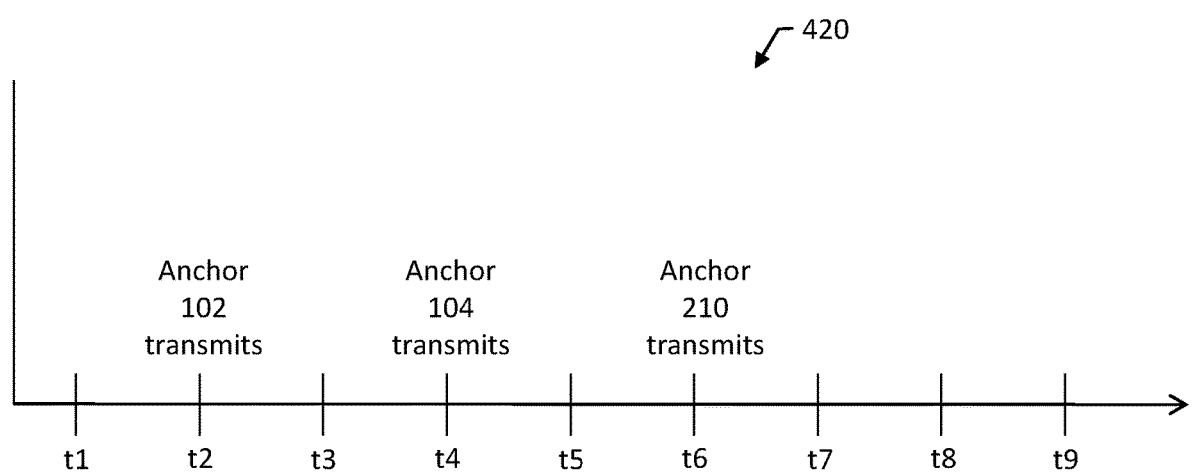
FIG. 4B is a timeline illustrating example assigned time slots for anchors to distribute time synchronization information by UWB.

FIG. 4B is a timeline 420 illustrating example assigned time slots for anchors to distribute time synchronization information by UWB for the system 200 of FIG. 2. For example, suppose that tags and anchors within the system are configured to listen for time synchronization information during times t1-t9 of each epoch. Anchor 102 can be assigned to transmit at time t2, anchor 104 can be assigned to transmit at time t4, and anchor 210 can be assigned to transmit at time t6. UWB devices that are in range of two or more of anchors 102, 104, and 210 will be able to receive time synchronization information from any devices in range without collisions.

Figure 5A:
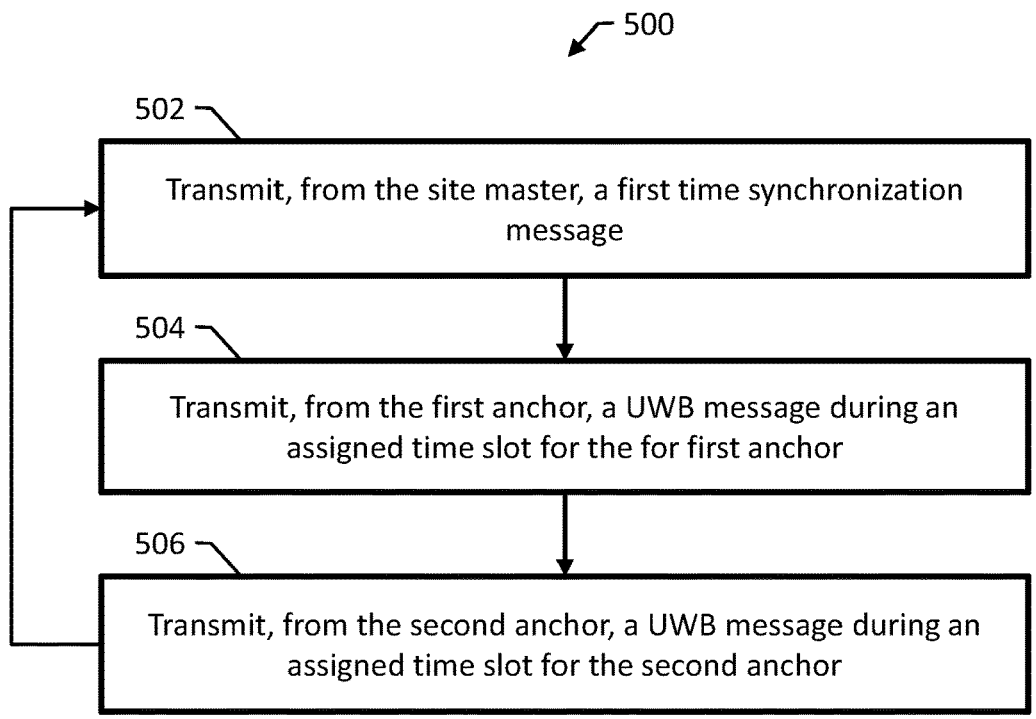
FIG. 5A is a flow diagram of an example method for distribution of time synchronization information to UWB devices.

FIG. 5A is a flow diagram of an example method 500 for distribution of time synchronization information to UWB devices using assigned time slots. Method 500 can be performed by the system 200 of FIG. 2.

Method 500 can include initializing the anchors and tags of tracking systems. Initializing the anchors and tags can include, e.g., assigning tags to groups of anchors, assigning anchors designated time slots to perform UWB ranging, and assigning time slots to anchors for distributing time synchronization information.

Method 500 includes transmitting, from a site master, a first time-synchronization message to at least a first anchor (502). Method 500 includes distributing time synchronization information, from the first anchor, to at least a second anchor by transmitting a first UWB message during an assigned time slot for the first anchor (504). The first UWB message includes timing information based on the first time-synchronization message.

Method 500 includes distributing time synchronization information, from the second anchor, to at least a third anchor by transmitting a second UWB message during an assigned time slot for the second anchor (506). The second UWB message includes timing information based on the first UWB message. In this manner, the time synchronization information can reach the third anchor even though the third anchor may not be within a physical radio frequency range of the first anchor for UWB communications. The timing synchronization information can be further distributed by UWB by additional anchors continuing to transmit UWB messages during later assigned time slots.

In some examples, transmitting the first UWB message comprises including a first stratum identifier in the first UWB message and an identifier for the site master as a source of time synchronization information in the first UWB message. Similarly, transmitting the second UWB message comprises including a second stratum identifier in the second UWB message.

Method 500 includes repeating the time synchronization distribution (return to 502). For example, method 500 can include continuously repeating the time synchronization at regular time intervals, e.g., once per system epoch.

Figure 5B:
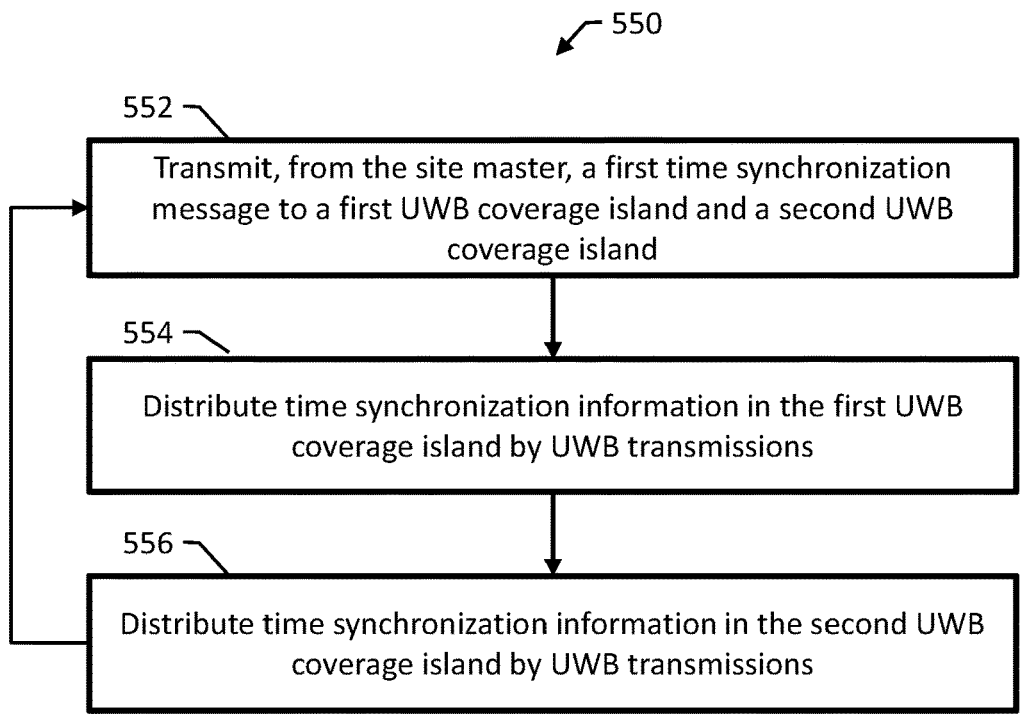
FIG. 5B is a flow diagram of an example method for distribution of time synchronization information to UWB coverage islands.

FIG. 5B is a flow diagram of an example method 550 for distribution of time synchronization information to UWB coverage islands. Method 550 can be performed by the system 300 of FIG. 3.

Method 550 can include initializing the anchors and tags of tracking systems. Initializing the anchors and tags can include, e.g., assigning tags to groups of anchors, assigning anchors designated time slots to perform UWB ranging, and assigning time slots to anchors for distributing time synchronization information.

Method 550 includes transmitting, from a site master, a first time-synchronization message to a first anchor in a first UWB coverage island and a second anchor in a second UWB coverage island (552). Transmitting the first time-synchronization message can include transmitting the first time-synchronization message by Wi-Fi to the first anchor in the first UWB coverage island and to the second anchor in the second UWB coverage island. In some examples, the site master transmits time synchronization information to multiple UWB coverage islands by sending separate messages to each UWB coverage island. For example, if the time-synchronization Wi-Fi messages can only be sent to one anchor at a time, then the site master can send a first time-synchronization message to the first anchor and then, later, send a second time-synchronization message to the second anchor.

Method 550 includes distributing time synchronization information, from the first anchor, to the anchors within the first UWB coverage island by one or more UWB transmissions (554). Method 550 includes distributing time synchronization information, from the second anchor, to the anchors within the second UWB coverage island by one or more UWB transmissions (556).

In some examples, method 550 includes distributing time synchronization information, from the first anchor, to a first plurality of tags within the first UWB coverage island by the same one or more first UWB transmissions made to the first plurality of anchors within the first UWB coverage island, and distributing time synchronization information, from the second anchor, to a second plurality of tags within the second UWB coverage island by the same one or more second UWB transmissions made to the second plurality of anchors within the second UWB coverage island. Method 550 can include maintaining, at the site master, a list of UWB coverage islands and, for each UWB coverage island on the list, a network address of a designed anchor within the UWB coverage island for distributing time synchronization information within the UWB coverage island.

Method 550 includes repeating the time synchronization distribution (return to 552). For example, method 550 can include continuously repeating the time synchronization at regular time intervals, e.g., once per system epoch.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system for distribution of time synchronization information to ultra-wide-band (UWB) devices, the system comprising:
   a plurality of anchors, wherein each anchor comprises at least one anchor processor, an anchor UWB radio, and an anchor timing system, wherein each anchor performs UWB ranging on a subset of a plurality of tags, each securable to an object for tracking, wherein each tag comprises at least one tag processor, a tag UWB radio, and a tag timing system, wherein the tag timing systems and the anchor timing systems are time synchronized; and
   a site master configured for transmitting a first time-synchronization message to a first anchor in a first UWB coverage island and a second anchor in a second UWB coverage island, wherein the first anchor is configured for distributing time synchronization information to a first plurality of anchors within the first UWB coverage island by one or more first UWB transmissions, and wherein the second anchor is configured for distributing time synchronization information to a second plurality of anchors within the second UWB coverage island by one or more second UWB transmissions.

2. The system of claim 1, wherein the site master is configured for transmitting the first time-synchronization message by Wi-Fi to the first anchor in the first UWB coverage island and to the second anchor in the second UWB coverage island.

3. The system of claim 1, wherein the first anchor is configured for distributing time synchronization information to a first plurality of tags within the first UWB coverage island by the same one or more first UWB transmissions made to the first plurality of anchors within the first UWB coverage island, and wherein the second anchor is configured for distributing time synchronization information to a second plurality of tags within the second UWB coverage island by the same one or more second UWB transmissions made to the second plurality of anchors within the second UWB coverage island.

4. The system of claim 1, wherein the site master is configured for maintaining a list of UWB coverage islands and, for each UWB coverage island on the list, a network address of a designed anchor within the UWB coverage island for distributing time synchronization information within the UWB coverage island.

5. The system of claim 1, wherein the first anchor is configured for transmitting the one or more first UWB transmissions during a first assigned time slot for the first anchor, and wherein at least one anchor of the first plurality of anchors within the first UWB coverage island is configured for distributing time synchronization information by transmitting one or more additional UWB transmissions during a second assigned time slot for the at least one anchor.

6. A method for distribution of time synchronization information to ultra-wide-band (UWB) devices, the method comprising:
   initializing a UWB local area network (LAN) comprising a plurality of anchors and a plurality of tags, each secured to an object for tracking, wherein each anchor comprises: at least one anchor processor, an anchor UWB radio, and an anchor timing system, and wherein each tag comprises: at least one tag processor, a tag UWB radio, and a tag timing system, wherein the tag timing systems are synchronized to the anchor timing systems;
   transmitting, from a site master, a first time-synchronization message to a first anchor in a first UWB coverage island and a second anchor in a second UWB coverage island;
   distributing time synchronization information, from the first anchor, to a first plurality of anchors within the first UWB coverage island by one or more first UWB transmissions; and
   distributing time synchronization information, from the second anchor, to a second plurality of anchors within the second UWB coverage island by one or more second UWB transmissions.

7. The method of claim 6, wherein transmitting the first time-synchronization message comprises transmitting the first time-synchronization message by Wi-Fi to the first anchor in the first UWB coverage island and to the second anchor in the second UWB coverage island.

8. The method of claim 6, comprising distributing time synchronization information, from the first anchor, to a first plurality of tags within the first UWB coverage island by the same one or more first UWB transmissions made to the first plurality of anchors within the first UWB coverage island, and distributing time synchronization information, from the second anchor, to a second plurality of tags within the second UWB coverage island by the same one or more second UWB transmissions made to the second plurality of anchors within the second UWB coverage island.

9. The method of claim 6, comprising maintaining, at the site master, a list of UWB coverage islands and, for each UWB coverage island on the list, a network address of a designed anchor within the UWB coverage island for distributing time synchronization information within the UWB coverage island.

10. The method of claim 8, comprising transmitting, at the first anchor, the one or more first UWB transmissions during a first assigned time slot for the first anchor, and distributing time synchronization information by transmitting, from at least one anchor of the first plurality of anchors within the first UWB coverage island, one or more additional UWB transmissions during a second assigned time slot for the at least one anchor.

* * * * *